United States Patent Office 3,741,962
Patented June 26, 1973

3,741,962
α-THIOUREIDOCEPHALOSPORANIC ACID COMPOUNDS
Hermann Breuer, Burgweinting, Germany, assignor to E. R. Squibb & Sons, Inc., Princeton, N.J.
No Drawing. Filed May 21, 1971, Ser. No. 145,955
Int. Cl. C07d 99/24
U.S. Cl. 260—243 C     11 Claims

ABSTRACT OF THE DISCLOSURE

New α-thioureidocephalosporanic acid compounds of the following general formula, and their salts,

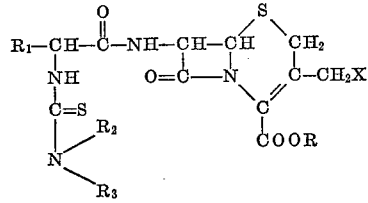

wherein R is hydrogen, lower alkyl, aralkyl, a salt forming ion or the group

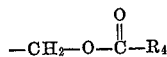

$R_1$ is hydrogen, lower alkyl, cyclo-lower alkyl, unsaturated cyclo-lower alkyl, aryl, aralkyl or a heterocyclic group; $R_2$ is hydrogen or lower alkyl; $R_3$ is hydrogen, lower alkyl, lower alkenyl, phenyl, benzoyl, lower alkoxy-lower alkyl or (carbo-lower alkoxy)lower alkyl; $R_4$ is lower alkyl, aryl or aralkyl and X is hydrogen, hydroxy, lower alkanoyloxy, aroyloxy, aralkanoyloxy, the radical of a nitrogen base, a quaternary ammonium radical or together X and R represent a bond linking carbon and oxygen in a lactone ring; are useful as antibacterial agents.

SUMMARY OF THE INVENTION

This invention relates to new antibacterial α-thioureidocephalosporanic acid compounds of the formula (I)

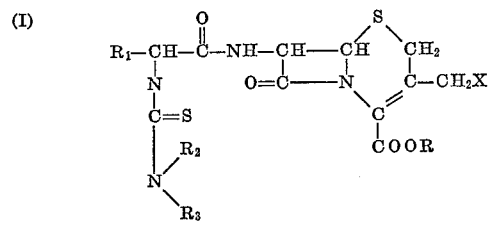

R represents hydrogen, lower alkyl, aralkyl, a salt forming ion or the group

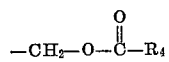

$R_1$ represents hydrogen, lower alkyl, cycloalkyl, unsaturated cycloalkyl, aryl, aralkyl or a heterocyclic group; $R_2$ is hydrogen or lower alkyl; $R_3$ represents hydrogen, lower alkyl, lower alkenyl, phenyl, benzoyl, lower alkoxy-lower alkyl or (carbo-lower alkoxy)lower alkyl, aryl or aralkyl; $R_4$ represents lower alkyl, aryl or aralkyl; X is hydrogen, hydroxy, lower alkanoyloxy, aroyloxy, aralkanoyloxy, the radical of a nitrogen base or a quaternary ammonium radical. In addition X and R may represent a bond linking carbon and oxygen in a lactone ring.

The preferred members within each group are as follows: R is hydrogen, lower alkyl or alkali metal, especially hydrogen, methyl, pivaloyloxy, sodium or potassium; $R_1$ is phenyl, 1,4-cyclohexadienyl, pyridyl, pyrrolidyl, morpholino, thienyl, furyl, oxazolyl, isoxazolyl, thiazolyl, especially phenyl and most especially 1,4-cyclohexadienyl; $R_2$ and $R_3$ each is hydrogen or lower alkyl, especially methyl or ethyl; $R_4$ is lower alkyl, preferably methyl or t-butyl. When $R_3$ is other than hydrogen or lower alkyl, $R_2$ is hydrogen.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like. The lower alkenyl groups are monounsaturated hydrocarbon radicals of the same type, the two to four carbon members being preferred.

Cycloalkyl groups include cycloaliphatic groups having three to seven carbons in the ring such as cyclopropyl, cyclobutyl, cyclopentyl, cyclohexyl and cycloheptyl. The cyclic groups may also be cycloalkenyl and cycloalkadienyl groups of the same type, e.g., cyclobutenyl, cyclopentenyl, cyclohexenyl, cyclopentadienyl, cyclohexadienyl, etc. The double bond or bonds may be variously located. A particularly preferred radical, as discussed later is the 1,4-cyclohexadienyl group. These may be simply substituded with one to three groups such as halogen, lower alkyl or lower alkoxy.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups (i.e., lower alkyl groups of the type defined above attached to an oxygen), hydroxy, lower alkanoyl or lower alkanoyloxy. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5-trimethoxyphenyl and p-hydroxyphenyl.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5 - diethylbenzyl, 3,4,5-trichlorobenzyl and the like.

The lower alkanoyloxy, aroyloxy and aralkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. The aroyloxy groups are derived from monocyclic carbocyclic aryl groups of the kind described. Similarly the aralkanoyloxy groups consist of monocyclic carbocyclic aryl and alkanoyloxy radicals of the type described. X also represents the radical of an amine, e.g., an alkylamine like methylamine, ethylamine, dimethylamine, triethylamine, aralkylamine like dibenzylamine, N,N'-dibenzylpyridinium, pyridinium, 1-quinolinium, 1-picolinium, etc. X and R may also join together, as indicated above to form a bond linking carbon and oxygen in a lactone ring.

The heterocyclic groups represented by $R_1$ are 5- to 6-membered monocyclic heterocyclic radicals (exclusive of hydrogen) containing nitrogen, sulfur or oxygen in the ring in addition to carbon (not more than two hetero atoms), and members of this group simply substituted as discussed above with respect to the aryl groups. The heterocyclic radicals include, for example, pyridyl, pyrrolidyl, morpholinyl, thienyl, furyl, oxazolyl, isoxazolyl, thiazolyl and the like, as well as the simply substituted members, especially the halo, lower alkyl (particularly methyl and ethyl), lower alkoxy (particularly methoxy and ethoxy), phenyl and hydroxy-lower alkyl (particularly hydroxymethyl and hydroxyethyl) substituted members.

The salt forming ions may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc.

Preferred groups of compounds are those having the formulas (II)
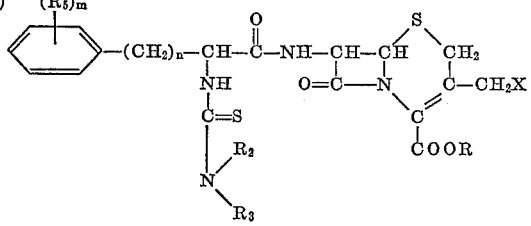

(III)
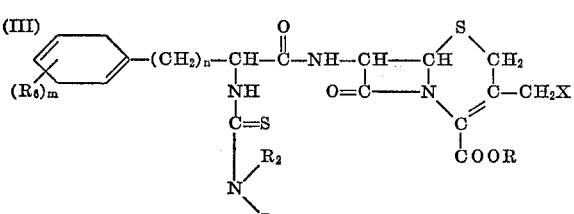

(IV)
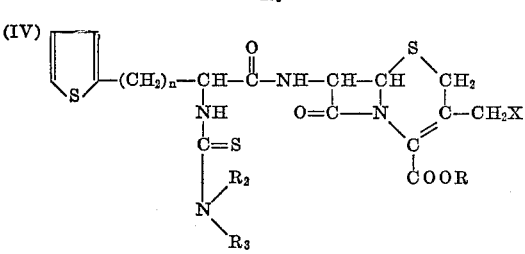

R and X have the same meaning described above but especially X is hydrogen or acetoxy, and R is hydrogen or sodium.

$R_5$ is hydrogen or a hydroxy, halogen, lower alkyl, lower alkoxy, lower alkanoyl or lower alkanoyloxy group such as those described above. $R_6$ is hydrogen, lower alkyl or lower alkoxy. $m$ is 1, 2 or 3 and $n$ is 0, 1, 2, 3 or 4. Most preferred are those compounds wherein $R_5$ and $R_6$ each is hydrogen, especially when $n$ is 0. $R_2$ and $R_3$ are hydrogen or lower alkyl.

The compounds of Formula I are produced by first forming a compound of the formula (V)
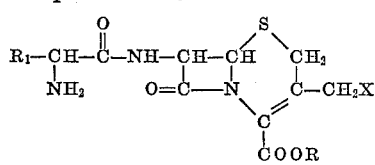

and then treating the compound of Formula V with an unsubstituted or substituted isothiocyanate of one of the following formulas:

(VI) 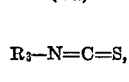  (VII) 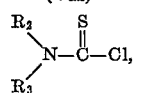  (VIII) 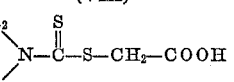

When an unsubstituted or monosubstituted product is desired, i.e., both $R_2$ and $R_3$ are hydrogen or $R_2$ is hydrogen and $R_3$ is other than hydrogen, an isothiocyanate of Formula VI is used. The compound of Formula V is dissolved in an organic solvent at a reduced temperature, e.g., about 0° C., and the isothiocyanate is slowly added. Suitable solvents include, for example, methanol, ethanol, acetonitrile, dimethylformamide, methylene chloride, chloroform and the like. When $R_2$ and $R_3$ are both hydrogen, ammonium thiocyanate may be used in aqueous medium.

When an N,N-disubstituted product of Formula I is desired, i.e., both $R_2$ and $R_3$ are other than hydrogen, a compound of Formula V is treated with either a compound of Formula VII (prepared as described in Houben-Weyl 9, page 831) or a compound of Formula VIII [prepared as described in Chemical Abstracts 54, pages 18368–9 (1960)] in a solvent such as those described above, especially methylene chloride, in the presence of a base like triethylamine, at a temperature in the range of about 0 to 20° C.

As an alternative, the compound of Formula X may first be reacted with one of the thiocyanates of Formula VI, VII or VIII under the conditions described above and then the reaction of the product thus obtained or a mixed anhydride thereof with a compound of Formula IX is carried out.

The substances of Formula V [which includes 7-aminocephalosporanic acid (7-ACA), 7-amino-3-desacetoxycephalosporanic acid (7-ADCA) and other derivatives] are produced from a 7-aminocephalosporanic acid compound of the formula (IX)
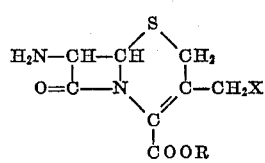

The compound of Formula IX may also be used in the form of derivatives such as aldimines or Schiff's bases formed with the amino group. Such derivatives are frequently useful because of their stability and in many cases give improved yields and more uniform reactions.

The compound of the foregoing formula is reacted with an α-amino acid of the formula (X) 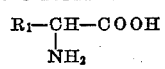

wherein $R_1$ has the meaning described above. For an efficient process, the amino group is best protected before reacting with IX. Protecting groups which may be used to protect the amino group during the reaction of the acid compound with the reaction partner of Formula VI include, for example, triphenylmethyl, t-butoxycarbonyl, $\beta,\beta,\beta$-trichloroethoxycarbonyl, 4-oxo-2-pentenyl-2,1-carbomethoxy-1-propenyl-2, carbobenzoxy or the like. These are formed by reacting the acid of Formula IX with a compound such as triphenylmethylchloride, t-butyl azidoformate, $\beta,\beta,\beta$-trichloroethyl chloroformate, acetylacetone, methylacetoacetate or the like. After the coupling reaction, if the protecting group is still present, it is removed, e.g., by treatment with aqueous acetic acid, trifluoroacetic acid, zinc-acetic acid, or aqueous mineral acid, respectively, to give the compound with the free or monosubstituted amino group.

Alternatively the amino group may be protected by protonation as the salt form before and during the subsequent reaction.

The reaction is preferably effected by conversion of the acid to an activated form such as the acid chloride, bromide, azide, p-nitrophenyl ester, anhydride, or mixed anhydride, Leuch's anhydride or by condensing in the presence of a carbodiimide such as dicyclohexylcarbodiimide.

In the case of a preferred compound of Formula II wherein $R_2$, $R_3$ and $R_5$ are all hydrogen and $n$ is 0, a preferred procedure comprises treating the starting material of Formula V wherein $R_1$ is phenyl with thiophosgene in the presence of triethylamine and then adding one molecular equivalent of ammonia in chloroform solution. Similarly, when $R_2$ or $R_3$ is other than hydrogen, one equivalent or more of an amine such as ethylamine, allylamine, other alkyl- or arylamines may be substituted for the ammonia.

The starting α-amino compound for the preparation of preferred products of Formula III is prepared by reducing a compound of the formula (XI) 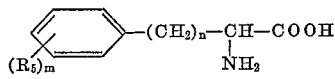

or a metal salt thereof, e.g., alkali metal salt, alkaline earth metal salt or the like, with sodium or lithium in liquid ammonia followed by treatment with an alcohol such as ethanol or t-butanol, followed by treatment with ammonium chloride, or other amine hydrochloride. Derivatives of compounds of Formula X in which the amino group is protected may also be treated in an analogous manner.

When R is the acyloxymethyl group

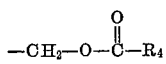

this group may be introduced onto the 7-aminocephalosporanic acid moiety either prior to or subsequent to the reaction with the α-amino acid or derivative by treatment with one to two moles of a halomethyl ester of the formula (XII)  hal—CH$_2$OCOR$_4$ wherein hal is halogen, preferably chlorine or bromine, in an inert organic solvent such as dimethylformamide, acetone, dioxane, benzene or the like at about ambient temperature or below.

The products of this invention form salts which are also part of the invention. Basic salts form with the acid moiety as discussed above when the symbol R is hydrogen.

It will be appreciated that certain of the compounds of this invention exist in various states of solvation as well as in different isomeric or optically active forms. The various forms as well as their mixtures are within the scope of this invention.

Ordinarily the new compounds of this invention derived from D-α-amino acids of Formula X or derivatives thereof are more active than the corresponding compound derived from the L-form or DL-form. The configuration of the α-carbon of the α-amino acid used in the synthesis is retained in the product.

Further process details are provided in the illustrative examples.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of Formula I or a physiologically acceptable salt thereof may be used in various animal species in an amount of about 1 to 200 mg./kg., daily, orally or parenterally, in single or two to four divided doses to treat infections of bacterial origin, e.g., 5.0 mg./kg. in mice.

Oral forms give prompt high blood levels which are maintained for relatively long periods.

Up to about 600 mg. of a compound of Formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.1 to 1% by weight of such compounds admixed with, suspended or dissolved in conventional inert dry or aqueous carriers for application by washing or spraying.

They are also useful as nutritional supplements in animal feeds.

The following examples are illustrative of the invention. All temperatures are on the centigrade scale. Additional variations may be produced in the same manner by appropriate substitution in the starting material.

EXAMPLE 1

7-(D-α-thioureidophenylacetamido)cephalosporanic acid (a) 600 mg. of N-carbobenzoxy-D-phenylglycine (prepared by the reaction of D-phenylglycine with carbobenzoxy chloride) are dissolved in 10 ml. of dry tetrahydrofuran. The solution is cooled in an ice-salt bath. To this are added 0.29 ml. of triethylamine with stirring over a period of 10 minutes, followed by 0.29 ml. of isobutyl chloroformate. Stirring is continued for 10 minutes at —5° C. 570 mg. of 7-aminocephalosporanic acid (7-ACA) and 0.29 ml. of triethylamine are dissolved in 5 ml. of tetrahydrofuran and 5 ml. of water, and the solution is centrifuged. The clarified solution is cooled in ice and slowly added to the reaction mixture, and stirring is continued in the ice bath for one-half hour, followed by one hour at room temperature. The reaction product mixture is evaporated under vacuum to a semi-solid residue. 35 ml. of water and a few drops of triethylamine are added to the residue to raise the pH to 8. The aqueous solution is then extracted successively with 50 ml. and 35 ml. portions of ethyl acetate, the pH being adjusted to 2 at each extraction with hydrochloric acid. The extracts are combined, filtered, dried over sodium sulfate, stripped of solvent and evaporated under vacuum to obtain 7-(N-carbobenzoxy-D-α-aminophenylacetamido)cephalosporanic acid as a yellow-white amorphous solid.

1.0 g. of this product is dissolved in 150 ml. of warm 95% ethyl alcohol. To the solution is added 1.0 g. of 5% palladium on carbon catalyst, and the mixture is hydrogenated at room temperature and atmospheric pressure. The hydrogenation product is filtered, the solid phase is suspended in ethyl acetate and water and adjusted to pH 2 with hydrochloric acid. The suspension is filtered, the aqueous phase is separated from the filtrate and evaporated under vacuum to obtain 7-(D-α-aminophenylacetamido)cephalosporanic acid.

(b) To a suspension of 75 mg. of 7-(D-α-aminophenylacetamido)cephalosporanic acid in 7.5 ml. of water there are added 120 mg. of ammonium thiocyanate with stirring. The reaction mixture, which soon clears, is incubated at 22–24° and the pH maintained between 5.0 and 6.9 by frequent dropwise additions of 1.0 N hydrochloric acid with stirring. After five hours, the solution is adjusted to 10.0 ml., acidified to pH 1.8 wtih 1.0 N hydrochloric acid, and extracted successively with four 75 ml. portions of ethyl acetate. The ethyl acetate is washed four times with 10 ml. portions of water adjusted to pH 2.0 with hydrochloric acid, filtered and evaporated at 10–20° C. in vacuo to give 7-(D-α-thioureidophenylacetamido)cephalosporanic acid.

The potassium salt is obtained by suspending the powder in 80 ml. of water and treating with an equivalent of 0.1 N aqueous potassium hydroxide solution added with vigorous stirring. The solution is evaporated to dryness in vacuo at 25–30° C. to obtain 7-(D-α-thioureidophenylacetamido)cephalosporanic acid, potassium salt.

(c) According to another modification the same product is obtained by the following procedure:

2.8 gms. of triethylamine are dissolved in 70 ml. of methylene chloride. This is cooled on an ice and water bath and 1.15 gms. of thiophosgene are added dropwise. Then 3.5 gms. of anhydrous 7-ACA are added to the reaction mixture and this is stirred for one hour at this temperature and an additional hour at room temperature. The reaction mixture is then again cooled on an ice and water bath and 1 mol. equivalent of ammonia, as a solution in cold chloroform, is added dropwise with stirring. The mixture is stirred at room temperature for another hour, the precipitate is filtered under suction, washed and dried under reduced pressure over phosphorous pentoxide.

EXAMPLE 2

7-[D-α-thioureido-2-(1,4-cyclohexadien-1-yl)acetamido]cephalosporanic acid, potassium salt (a) D-2-amino-2-(1,4-cyclohexadienyl)acetic acid.—A solution of 11.0 g. (72.7 mmole) of D-phenylglycine in 900 ml. distilled ammonia (which has been treated with 45 mg. lithium after distillation to destroy traces of moisture) is slowly diluted with 370 ml. dry t-butyl alcohol.

Over a period of 2 hours, 1.65 g. lithium (3.27 eq.) is added in small portions until a permanent blue color is obtained. The blue reaction mixture is then treated with 38 g. of triethylamine hydrochloride. The ammonia is allowed to evaporate at room temperature overnight and the residual solvent is evaporated at reduced pressure. The white residue is taken up in a small amount of methanol-water and added to 4 l. of cold 1:1 chloroform acetone to precipitate the crude product. After 20 minutes stirring the suspension is filtered and the white filter cake dried in vacuo; the filter cake is then pulverized and submitted once more to the precipitation process from 1:1 chloroform-acetone. D-2-amino-2-(1,4-cyclohexadien-1-yl)acetic acid is obtained as a white crystalline product, M.P. 297° (dec.).

(b) Methyl acetoacetic ester enamine of N-2-amino-2-(1,4-cyclohexadienyl)acetic acid, sodium salt.—306 mg. D - 2 - amino-2-(1,4 - cyclohexadienyl)acetic acid (2.00 mmoles) are dissolved by warming in a solution of 108 mg. of NaOCH$_3$ (2.00 mmoles) in 4.3 ml. reagent grade MeOH. 255 mg. (.24 ml.—2.20 mmoles) methyl acetoacetate are added and the mixture refluxed for 45 minutes. The MeOH is almost totally stripped off in vacuo. 5 ml. benzene are added and distilled off to a small residual volume. The addition and distillation of benzene is repeated to insure complete removal of the MeOH and water. The product crystallizes out overnight from a small residual volume of benzene. It is filtered off, washed with benzene and dried in vacuo.

(c) 7-[D - 2 - amino - 2-(1,4-cyclohexadien-1-yl)acetamido]cephalosporanic acid.—452 mg. of 7-aminocephalosporanic acid (7-ACA) are stirred well in 2.5 ml. of water while 0.23 ml. triethylamine are gradually added with the pH kept under 8.0. Final pH is 7.4; 0.85 ml. acetone are added and the solution is kept at −10° C.

469 mg. methyl acetoacetate enamine of D-2-amino-2-(1,4-cyclohexadienyl)acetic acid, sodium salt, are stirred in 4.25 ml. acetone at −20° C. A microdrop of N-methylmorpholine is added followed by the slow addition of 198 mg. of ice cold ethyl chloroformate. 0.43 ml. of water is added at this point. The reaction mixture is stirred for 10 minutes at −20° C.

The solution of mixed anhydride is then added to the 7-ACA solution. The solution is stirred for 30 minutes at −10° C., then raised to room temperature, acidified to pH 2.0 with diluted HCl and, with good stirring the pH is kept at that level for 10 minutes.

The solution is then extracted with 5 ml. xylene. The aqueous layer is layered with 5 ml. methyl isobutyl ketone and the pH adjusted to 5.0 with 1 N NaOH and chilled overnight. The resulting crystals are filtered off, washed with water and air dried.

(d) 7-[D-2-thioureido-2-(1,4 - cyclohexadien - 1 - yl)acetamido]cephalosporanic acid, potassium salt.—By substituting the product of part c for the 7-(D-α-aminophenylacetamido)cephalosporanic acid in the procedure of Example 1b, 7-[D-2-thioureido-2-(1,4-cyclohexadien - 1 - yl)acetamido]cephalosporanic acid and its potassium salt are obtained.

EXAMPLE 3

7-(D-α-thioureidophenylacetamido)-3-desacetoxycephalosporanic acid, potassium salt 7-amino-3-desacetoxycephalosporanic acid (7-ADCA) is produced as described in U.S. Pat. 3,391,141. 7-(D-α-aminophenylacetamido)desacetoxycephalosporanic acid is produced by substituting 7-ADCA for the 7-ACA in the procedure of Example 1a. Then by substituting this product for the 7-(D-α-aminophenylacetamido)cephalosporanic acid in the procedure of Example 1b, 7-(D-α-thioureidophenylacetamido) - 3 - desacetoxycephalosporanic acid, potassium salt, is obtained.

EXAMPLE 4

7-[D-α-thioureido-(1,4-cyclohexadien-1-yl)acetamido]-3-desacetoxycephalosporanic acid, potassium salt 7-[D-α-amino-(1,4 - cyclohexadien - 1 - yl)acetamido]-3-desacetoxycephalosporanic acid is obtained by the procedure of Example 2 by substituting 7-ADCA for 7-ACA in part c. Then utilizing this product in part d, 7-[D-α-thioureido-(1,4 - cyclohexadien - 1 - yl)acetamido]-3-desacetoxycephalosporanic acid, is obtained.

EXAMPLE 5

7-[DL-2-thioureido-3-phenylpropionamido]cephalosporanic acid, potassium salt

By substituting DL-phenylalanine for the D-phenylglycine in part a and thereafter following the complete procedure of Example 1, the above named compound is obtained.

EXAMPLE 6

7-[D-2-thioureido-3-(1,4-cyclohexadien-1-yl)propionamido]cephalosporanic acid (a) D-2-amino-3-(1,4-cyclohexadien - 1 - yl)propionic acid.—12.0 g. of D-phenylalanine are substituted for the D-phenylglycine in the procedure of Example 2 to obtain D-2-amino-3-(1,4 - cyclohexadien - 1 - yl)propionic acid as a white powder.

(b) Methyl acetoacetate ester enamine of D-2-amino-3-(1,4-cyclohexadienyl)propionic acid sodium salt.—This product is obtained by substituting 330 mg. of the product of part a above in the procedure of Example 2b.

(c) 7-[D-2-amino-3-(1,4 - cyclohexadien - 1 - yl)propionamido]cephalosporanic acid.—493 mg. of methyl acetoacetate enamine of D-2-amino-3-(1,4-cyclohexadien-yl)propionic acid sodium salt (1.715 mmoles) are substituted for the methyl acetoacetate enamine of D-2-amino-2-(1,4-cyclohexadienyl)acetic acid sodium salt in the procedure of Example 2c.

The mixed anhydride is added to the 7-ACA, stirred for 30 minutes at −10° C., brought to room temperature; acidified to pH 2.0 as in Example 2c. The solution is then extracted with 5 ml. of xylene. The aqueous layer is layered with 5 ml. of methyl isobutyl ketone and the pH is adjusted to 5.0 with 1 N NaOH. The aqueous layer is then lyophilized to give 7-[D-2-amino-3-(1,4-cyclohexadien-1-yl)propionamido]cephalosporanic acid.

(d) By utilizing the product of part c in the procedure of Example 2d, 7-[D-2-thioureido - 3 - (1,4-cyclohexadien - 1 - yl)propionamido]cephalosporanic acid is obtained.

EXAMPLE 7

7-[α-(allylthioureido)phenylacetamido]cephalosporanic acid 1.45 ml. (0.015 mol.) of allylthiocyanate are added to 70 ml. of methylene chloride. The clear solution is cooled to 0° and 4.35 gms. of α-aminophenylacetamidocephalosporanic acid are added with stirring. The mixture is stirred for 5 hours at 0°. 70 ml. of methanol are added and the mixture is stirred for an additional 2 hours at 0°. The greater part of the solvent is taken off. The residue is taken up in 70 ml. of ether and cooled on an ice and water bath. After filtering under suction, the precipitate is washed with ether and then dried under reduced pressure to obtain the product, 7-[α-(allylthioureido)phenylacetamido]cephalosporanic acid.

EXAMPLE 8

Triethylamine salt of 7-[α-(methylthioureido)phenylacetamido]cephalosporanic acid In a 500 ml. flask a solution is formed from 200 ml. of methylene chloride, 3.5 ml. of triethylamine and 3.5 gms. of anhydrous 7-ACA, a solution of 1.019 ml. of methylthioisocyanate in 10 ml. of methylene chloride is added all at one time with stirring. The mixture is stirred at room temperature for two hours. After removing the solvent under reduced pressure, the dry residue is immediately pulverized and dried under reduced pressure to obtain the triethylamine salt of 7 - [α - (methylthioureido)phenylacetamido]cephalosporanic acid.

The following additional products having the Formula C of the table are obtained according to the procedure of Example 1 by substituting for the D-phenylglycine in part a the α-aminoacid having the $R_1$ indicated in the table and substituting the appropriate cephalosporanic acid compound for 7-ACA, then utilizing instead of the thiophosgene in part c the thioisocyanate of Formula B with the substituents $R_2$ and $R_3$ indicated in the table:

TABLE $$R_1-CH-COOH$$
$$|$$
$$NH_2$$

(A)

$$\begin{matrix}R_3\\ \diagdown\\ N=C=S\\ \diagup\\ R_2\end{matrix}$$

(B)

$$R_1-CH-CO-NH-CH-CH \begin{matrix}S\\ \diagup\ \diagdown\\ CH_2\\ |\ \ \ \ \ \ \ |\ \ CH_2\\ NH\ \ \ \ \ \ \ \ C-N\\ |\ \ \ \ \ \ \ \ \ \ \ \ \ \|\ \ \ \ \diagdown\\ C=S\ \ \ \ \ O\ \ \ \ \ C-OR\\ |\ \ \ \ \ \ \ \ \ \ \ \ \ \ \ \ \ \ \ \ \ \|\\ N-R_2\ \ \ \ \ \ \ \ \ \ \ \ \ O\\ |\\ R_3\end{matrix}$$

(C)

| | (A) | | | (B) | | | (C) | | | |
|---|---|---|---|---|---|---|---|---|---|---|
| Example: | $R_1$ | $R_2$ | $R_3$ | | $R_2$ | $R_3$ | R | $R_1$ | $R_2$ | $R_3$ | X |
| 9 | H | $CH_3$ | $CH_3$ | | $CH_3$ | $CH_3$ | $CH_3$ | H | $CH_3$ | $CH_3$ | H. |
| 10 | $CH_3$ | $C_2H_5$ | H | | $C_2H_5$ | H | $C_2H_5$ | $CH_3$ | $C_2H_5$ | H | OH. |
| 11 | $C_3H_7$ | $C_2H_5$ | $C_2H_5$ | | $C_2H_5$ | $C_2H_5$ | $C_2H_5$ | $C_3H_7$ | $C_2H_5$ | $C_2H_5$ | Pyridinium. |
| 12 | $C_6H_5CH_2$— | $CH_3$ | $CH_3$ | | $CH_3$ | $CH_3$ | $C_6H_5CH_2$— | $C_6H_5CH_2$— | $CH_3$ | $C_6H_5CH_2$ | $OCOCH_3$. |
| 13 | 4-Cl$C_6H_4$— | H | H | | H | H | —CH$_2$OC—CH(CH$_3$)$_2$ | 4-Cl$C_6H_4$— | H | H | $OCOCH_3$. |
| 14 | 3,4-(CH$_3$O)$_2$C$_6$H$_3$— | $C_2H_5$ | $C_2H_5$ | | $C_2H_5$ | $C_2H_5$ | $C_2H_5$ | 3,4-(CH$_3$O)$_2$C$_6$H$_3$— | $C_2H_5$ | $C_2H_5$ | H. |
| 15 | 3,4,5-(CH$_3$O)$_3$C$_6$H$_2$— | | H | | | H | | 3,4,5-(CH$_3$O)$_3$C$_6$H$_2$— | | H | $OCOCH_3$. |
| 16 | 4-OH$C_6H_4$— | | H | | | H | —CH$_2$OC—C$_6$H$_5$ | 4-OH$C_6H_4$— | | H | $OCOCH_3$. |
| 17 | 3,4-(Br)$_2$C$_6H_3$CH$_2$— | $C_2H_5$ | $C_2H_5$ | | $C_2H_5$ | $C_2H_5$ | Lactone ((+ X) | 3,4-(Br)$_2$C$_6H_3$CH$_2$— | $C_2H_5$ | $C_2H_5$ | Lactone (+ R). |
| 18 | 2,4-(Cl)$_2$C$_6H_3$— | | | | | | | 2,4-(Cl)$_2$C$_6H_3$— | | | $OCOCH_3$. |
| 19 | $C_2H_5$ | $C_2H_5$ | $C_2H_5$ | | $C_2H_5$ | $C_2H_5$ | $C_2H_5$ | $C_2H_5$ | $C_2H_5$ | $C_2H_5$ | $OCOCH_3$ |
| 20 | 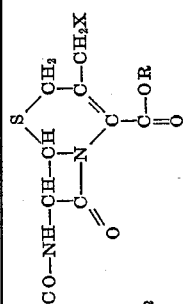 | $C_2H_5$ | $C_2H_5$ | | $C_2H_5$ | $C_2H_5$ | $C_2H_5$ | 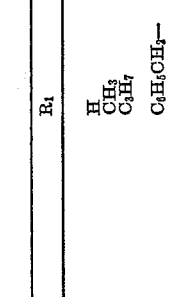 | $C_2H_5$ | $C_2H_5$ | $OCOCH_3$ |
| 21 | 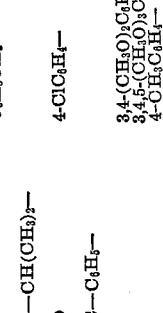 | $C_2H_5$ | $C_2H_5$ | | $C_2H_5$ | $C_2H_5$ | $C_2H_5$ | 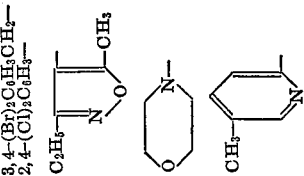 | $C_2H_5$ | $C_2H_5$ | $OCOCH_3$ |

TABLE—Continued $$R_1-\underset{NH_2}{\underset{|}{CH}}-COOH \qquad \underset{R_2}{\overset{R_3}{>}}N-C=S \qquad R_1-\underset{NH}{\underset{|}{CH}}-CO-NH-\underset{}{\underset{}{CH}}-\underset{}{\underset{}{CH}}\underset{O=}{\overset{S}{\diagup}}\underset{}{\overset{CH_2}{\diagdown}}\underset{N}{\overset{}{\diagdown}}\underset{C-OR}{\overset{C-CH_2X}{\diagdown}}$$

$$\underset{R_3}{\underset{|}{\overset{|}{C=S}}}\underset{}{\overset{}{N-R_2}}$$

| | (A) | | | (B) | | | (C) | | | |
|---|---|---|---|---|---|---|---|---|---|---|
| | R₁ | R₂ | R₃ | R | R₂ | R₃ | R₁ | R₂ | R₃ | X |
| 22 | (thienyl) | C₂H₅ | C₂H₅ | C₂H₅ | C₂H₅ | C₂H₅ | (thienyl) | C₂H₅ | C₂H₅ | OCOCH₃ |
| 23 | (furyl) | H | C₆H₅CH₂ | C₆H₅CH₂— | H | C₆H₅CH₂ | (furyl) | H | C₆H₅CH₂— | —OOCH₂C₆H₅ |
| 24 | C₆H₅— | H | C₆H₅CO— | —CH₂OC(O)—CH(CH₃)₂ | H | C₆H₅CO— | C₆H₅ | H | C₆H₅CO | H. |
| 25 | C₆H₅— | H | C₆H₅ | —CH₂OC(O)—CH(CH₃)₂ | H | C₆H₅ | C₆H₅ | H | C₆H₅ | —OOC—C₆H₅ |
| 26 | C₆H₅— | H | C₂H₅ | H | H | C₂H₅ | C₆H₅ | H | C₆H₅ | H. |
| 27 | C₆H₅— | H | —CH₂COOC₆H₅ | Na | H | —CH₂COOC₆H₅ | C₆H₅ | H | CH₂COOC₆H₅ | H. |
| 28 | C₆H₅— | CH₃ | CH₃ | H | CH₃ | CH₃ | C₆H₅ | CH₃ | CH₃ | —OCOCH₃ |
| 29 | C₆H₅— | H | —CH₂CH=CH₂ | H | H | —CH₂CH=CH₂ | C₆H₅— | H | —CH₂CH=CH₂ | H. |
| 30 | C₆H₅— | H | —CH₂OCH₃ | Na | H | —CH₂OCH₃ | C₆H₅— | H | —CH₂OCH₃ | H. |
| 31 | C₆H₅— | H | —CH₂COOC₂H₅ | Na | H | —CH₂COOC₂H₅ | C₆H₅— | H | —CH₂COOC₂H₅ | OCOCH₃ |

EXAMPLE 32

7-[D - 2 - methylthioureido - 2 - (4 - methoxy - 1,4-cyclohexadien - 1 - yl)propionamidocephalosporanic acid, potassium salt By substituting 14.2 g. (72.7 mmole) of D-O-methyltyrosine for the phenylglycine in the procedure of Example 2a, D-2-amino-3-(4 - methoxy - 1,4 - cyclohexadienyl)propionic acid is obtained as a white crystalline product, M.P. 227° C.

Then by using this compound in the procedure of Example 2, parts b, c and d, and utilizing methylthioisocyanate, the above named product is obtained.

EXAMPLE 33

7-[D-2-thioureido-3-(1,4-cyclohexadien-1-yl)propionamido]-3-desacetoxycephalosporanic acid By utilizing the procedure of Example 6, but substituting 356 mg. of 3-desacetoxy-7-aminocephalosporanic acid for the 7-ACA the above product is obtained.

EXAMPLE 34

7-[D - 2 - thioureido - 3 - (4 - methoxy - 1,4 - cyclohexadien - 1 - yl)propionamido] - 3 - desacetoxycephalosporanic acid By utilizing 544 mg. of methyl acetoacetate enamine of D-2-amino - 3 - (4-methoxy - 1,4 - cyclohexadienyl) propionic acid sodium salt of Example 2, the 7-desacetoxy-7-aminocephalosporanic acid, as in Example 2, the above product is obtained.

EXAMPLE 35

7-[2 - thioureido - 2 - (1,4 - cyclohexadien - 1 - yl)acetamido] - 3 - (1 - pyridiniummethyl) - 3 - cephem - 4 - carboxylate A 0.1 molar solution of the 7-[2-thioureido - 2 - (1,4-cyclohexadienyl)acetamido]cephalosporanic acid (as prepared in Example 2d) is treated with 0.5 mole pyridinium acetate at pH 7 (the pH is adjusted to 7 with a few drops of aqueous pyridine solution) for several hours at room temperature. A rapid solvolysis occurs which can be followed by paper chromatography; when the disappearance of the starting material is complete, lyophilization provides good yields of the product in the form of the acetate as a fine, white powder.

EXAMPLE 36

7-[2-thioureido - 3 - (1,4-cyclohexadien - 1 - yl)propionamido] - 3 - (1 - pyridiniummethyl) - 3 - cephem-4-carboxylate This compound is obtained as the acetate by utilizing the procedure of Example 35 employing 7-[2-thioureido- 3-(1,4 - cyclohexadien - 1 - yl)propionamido]cephalosporanic acid.

EXAMPLE 37

7-(2-thioureido-n-valeramido)cephalosporanic acid

By substituting valine for the phenylglycine in the procedure of Example 1, the above product is obtained.

EXAMPLE 38

7-(2-allylthioureidocaproamido)cephalosporanic acid

By substituting norleucine for the phenyl glycine in the procedure of Example 1, and utilizing allylisothiocyanate as in Example 7, the above product is obtained.

EXAMPLE 39

7-(2-thioureido-2-cyclohexylacetamido)cephalosporanic acid

By substituting α - cyclohexylglycine for the phenyl glycine in the procedure of Example 1, the above product is obtained.

EXAMPLE 40

7-[D-2-(methylthioureido) - 2 - (1,4 - cyclohexadien-1-yl)acetamido] - 3 - desacetoxycephalosporanic acid and potassium salt 3.7 g. (0.01 mol.) of 7-[D - 2 - amino - 2 - (1,4-cyclohexadien - 1 - yl)acetamido] - 3 - desacetoxycephalosporanic acid monohydrate are suspended in 200 ml. of methylene chloride. 2.76 ml. of triethylamine are added, then 1.05 g. of methylisothiocyanate and the mixture is stirred overnight. An almost clear solution results. The mixture is filtered and the filtrate is concentrated. The residue is dissolved in 75 ml. of methanol and 8 ml. of a 2 N solution of potassium ethylhexanoate in n-butanol are added to the solution. Upon the addition of sufficient ether, the potassium salt of 7-[D-2-(methylthioureido)-2-(1,4 - cyclohexadien - 1 - yl)acetamido]-3-desacetoxycephalosporanic acid precipitates. Yield=3.8 g., M.P. 200° (w. dec.). In the IR spectrum a band at 1763 cm.$^{-1}$ is characteristic of the β-lactam.

The potassium salt is water soluble. Upon acidification with dilute hydrochloric acid there is obtained the free 7-[D - 2 - (methylthioureido) - 2 - (1,4-cyclohexadien-1 - yl)acetamido] - 3 - desacetoxycephalosporanic acid, M.P. 155° (w. dec.), β-lactam band in the IR-spectrum at 1760 cm.$^{-1}$.

EXAMPLE 41

7-[D - 2 - (allylthioureido) - 2 - (1,4-cyclohexadien-1-yl)acetamido] - 3 - desacetoxycephalosporanic acid and potassium salt By following the procedure of Example 40 but substituting 1.37 g. of allylisothiocyanate instead of methylisothiocyanate there is obtained the potassium salt of 7-[D - 2 - (allylthioureido) - 2 - (1,4-cyclohexadien-1-yl)acetamido] - 3 - desacetoxycephalosporanic acid. Yield=4.5 g., β-lactam band in the IR-spectrum at 1765 cm.$^{-1}$.

EXAMPLE 42

7-[D-2-(cyclohexylthioureido) - 2 - (1,4-cyclohexadien-1-yl)acetamido] - 3 - desacetoxycephalosporanic acid potassium salt By following the procedure of Example 40 but substituting 1.95 g. of cyclohexylisothiocyanate for the methylisothiocyanate, there is obtained the potassium salt of 7-[D - 2 - (cyclohexylthioureido) - 2 - (1,4-cyclohexadien - 1 - yl)acetamido] - 3 - desacetoxycephalosporanic acid, yield=4.6 g., M.P. 200° (w. dec.), β-lactam band in the IR-spectrum at 1763 cm.$^{-1}$.

By dissolving the salt in water and acidifying with dilute hydrochloric acid, the free acid is obtained, M.P. 120° (w. dec.)

EXAMPLE 43

The following additional compounds are obtained by the procedure of Example 40:

7-[D - 2 - (phenylthioureido) - 2 - (1,4 - cyclohexadien - 1 - yl)acetamido] - 3 - desacetoxycephalosporanic acid; yield=4.6 g., M.P. 180° C. (w. dec.).

7-[D - 2 - (methoxymethylthioureido) - 2 - (1,4-cyclohexadien - 1 - yl]acetamido] - 3 - desacetoxycephalosporanic acid potassium salt; yield=4.4 g., M.P. 215–220° (w. dec.).

7-[D - 2 - (ethoxycarbonylmethylthioureido) - 2 - (1,4-cyclohexadien - 1 - yl]acetamido - 3 - desacetoxycephalosporanic acid potassium salt; yield=4.9 g., M.P. 250° (w. dec.).

EXAMPLE 44

A sterile powder for reconstitution for use intramuscularly is prepared from the following ingredients which supply 1000 vials each containing 250 mg. of active ingredient:

| | Gm. |
|---|---|
| 7 - (D - α - thioureidophenylacetamido)cephalosporanic acid, sterile | 250 |
| Lecithin powder, sterile | 50 |
| Sodium carboxymethylcellulose, sterile | 20 |

The sterile powders are aseptically blended and filled into sterile vials, and sealed. The addition of 1 ml. of water for injection to the vial provides a suspension for intramuscular injection.

EXAMPLE 45

A preformed suspension is prepared from the following ingredients which supply 1000 vials each containing 300 mg. of active ingredient in 1 ml. of water for intramuscular injection:

| | Gm. |
|---|---|
| 7 - [D - 2 - thioureido - 2 - (1,4 - cyclohexadien-1-yl)acetamido]cephalosporanic acid, sterile | 300 |
| Lecithin, sterile | 60 |
| Sodium carboxymethylcellulose, sterile | 10 |
| Acetate buffer, sterile, pH 4.5. | |
| Methyl paraben, sterile | 1.2 |
| Propyl paraben, sterile | 0.2 |
| Water for injection, qs. 1 liter. | |

The parabens are dissolved in the acetate buffer and mixed with the water for injection. The lecithin and sodium carboxymethylcellulose are added and dissolved. The active compound is then added with stirring to make a homogeneous suspension. The suspension is filled into sterile vials each containing 1 ml., sealed and stored under refrigeration.

What is claimed is:

1. A compound of the formula $$R_1-CH-CO-NH-CH-CH \begin{array}{c} S \\ \diagup \diagdown \\ CH_2 \end{array}$$
$$\begin{array}{ccc} | & | & | \\ NH & O=C-N & C-CH_2X \\ | & \diagdown \diagup \\ C=S & C \\ | & | \\ R_2 & COOR \\ | & \\ N & \\ \diagdown & \\ R_3 & \end{array}$$

wherein R is hydrogen, lower alkyl, aryl-lower alkyl $$-CH_2-O-\overset{O}{\underset{\|}{C}}-R_4$$

or a salt forming ion of the group consisting of aluminum, alkali metal, alkaline earth metal, dibenzylamine, N,N-dibenzylethylenediamine, methylamine, triethylamine and N-ethylpiperidine; $R_1$ is hydrogen, lower alkyl, cyclo-lower alkyl of 3 to 7 carbon atoms and 0 to 2 double bonds, aryl, aryl-lower alkyl or a heterocyclic of the group consisting of pyridyl, pyrrolidyl, morpholinyl, thienyl, furyl, oxazolyl, isoxazolyl, thiazolyl and said heterocyclics bearing chlorine, bromine, lower alkyl, lower alkoxy, phenyl or hydroxy-lower alkyl; $R_2$ is hydrogen or lower alkyl; $R_3$ is hydrogen, lower alkyl, lower alkenyl, phenyl, benzoyl, lower alkoxy-lower alkyl or (carbo-lower alkoxy)lower alkyl; $R_4$ is lower alkyl, aryl or aryl-lower alkyl; and X is hydrogen, hydroxy, lower alkanoyloxy, aroyloxy, aryl-lower alkanoyloxy, lower alkylamine, aryl-lower alkyl, N,N'-dibenzylpyridinium, pyridinium, 1-quinolinium, 1-picolinium or X and R join to form a bond linking carbon and oxygen in a lactone ring; the aryl groups in said aryl, aryl-lower alkyl, aroyloxy and aryl-lower alkanoyloxy groups being phenyl or chlorine-, bromine-, lower alkyl-, lower alkoxy-, hydroxy-, lower alkanoyl-, or lower alkanoyloxy-substituted phenyl.

2. A compound as in claim 1 wherein R is hydrogen, lower alkyl, pivaloyloxy or alkali metal; $R_1$ is phenyl, 1,4-cyclohexadienyl, pyridyl, pyrrolidyl, morpholino, thienyl, furyl, oxazolyl, isoxazolyl or thiazolyl; $R_2$ and $R_3$ each is hydrogen or lower alkyl; $R_4$ is lower alkyl and X is hydrogen or acetoxy.

3. A compound of the formula

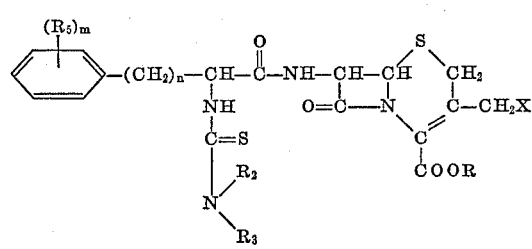

wherein X, R, $R_2$ and $R_3$ are as defined in claim 1, $R_5$ is hydrogen, hydroxy, chlorine, bromine, lower alkyl, lower alkoxy, lower alkanoyl or lower alkanoyloxy, m is 1, 2 or 3 and n is 0, 1, 2, 3 or 4.

4. A compound of the formula

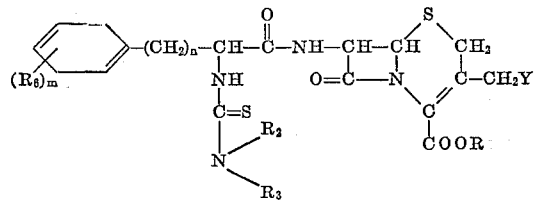

wherein X, R, $R_2$ and $R_3$ are as defined in claim 1, $R_6$ is hydrogen, lower alkyl or lower alkoxy, m is 1, 2 or 3 and n is 0, 1, 2, 3 or 4.

5. A compound as in claim 3 wherein R, $R_2$, $R_3$ and $R_5$ each is hydrogen, X is acetoxy, and n is 0.

6. A compound as in claim 3 wherein R, $R_2$, $R_3$, $R_5$ and X each is hydrogen and n is 0.

7. A compound as in claim 4 wherein R, $R_2$, $R_3$ and $R_6$ each is hydrogen, X is acetoxy and n is 0.

8. A compound as in claim 4 wherein R, $R_2$, $R_3$, $R_6$ and X each is hydrogen and n is 0.

9. A process for the production of a compound of claim 1 which comprises reacting a compound of one of the following formulas

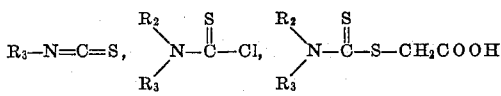

wherein $R_2$ and $R_3$ have the same meaning as in claim 1, with a compound of the formula

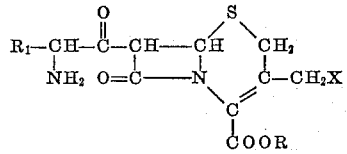

wherein R, $R_1$ and X have the same meaning as in claim 1.

10. A process for the production of a compound of claim 1 which comprises reacting a compound of the formula

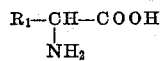

wherein $R_1$ has the same meaning as in claim 1, or a derivative thereof, with a compound of the following formulas

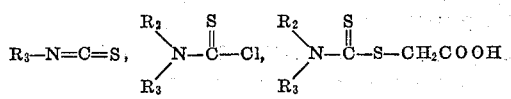

wherein $R_2$ and $R_3$ have the same meaning as in claim 1, and reacting the product of this reaction with a 7-aminocephalosporanic acid compound of the formula

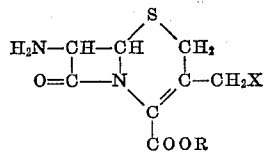

wherein R and X have the same meaning as in claim 1.

11. A compound of the formula

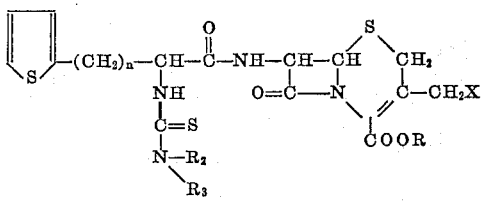

wherein X, R, $R_2$ and $R_3$ are as defined in claim 1 and n is 0, 1, 2, 3 or 4.

References Cited
UNITED STATES PATENTS
3,497,505   2/1970   Pfeiffer et al. _____ 260—243 C NICHOLAS S. RIZZO, Primary Examiner U.S. Cl. X.R.
424—246

PO-1050
(5/69)

UNITED STATES PATENT OFFICE
CERTIFICATE OF CORRECTION

Patent No. 3,741,962          Dated June 26, 1973

Inventor(s) Hermann Breuer

It is certified that error appears in the above-identified patent and that said Letters Patent are hereby corrected as shown below:

Column 10, Example 19, (both formulas appearing under $R_1$) that portion of the formula reading $C_2H_5-$ should read $C_6H_5-$.

Signed and sealed this 27th day of November 1973.

(SEAL)
Attest:

EDWARD M. FLETCHER, JR.
Attesting Officer

RENE D. TEGTMEYER
Acting Commissioner of Patents